United States Patent
Lin

(10) Patent No.: US 10,324,626 B2
(45) Date of Patent: Jun. 18, 2019

(54) CONTROL METHOD FOR STORING DATA ACCORDING TO BUFFER POINTER AT CLOCK SIGNAL CONVERSIONS

(71) Applicants: Inventec (Pudong) Technology Corp., Shanghai (CN); Inventec Corporation, Taipei (TW)

(72) Inventor: Chih-Lung Lin, Taipei (TW)

(73) Assignees: Inventec (Pudong) Technology Corp., Shanghai (CN); Inventec Corporation, Taipei (TW)

(*) Notice: Subject to any disclaimer, the term of this patent is extended or adjusted under 35 U.S.C. 154(b) by 13 days.

(21) Appl. No.: 15/864,005

(22) Filed: Jan. 8, 2018

(65) Prior Publication Data

US 2019/0155508 A1 May 23, 2019

(30) Foreign Application Priority Data

Nov. 17, 2017 (CN) .......................... 2017 1 1142682

(51) Int. Cl.
*G06F 13/38* (2006.01)
*G06F 3/06* (2006.01)
*G06F 13/16* (2006.01)
*G06F 13/42* (2006.01)

(52) U.S. Cl.
CPC ............ *G06F 3/0607* (2013.01); *G06F 3/065* (2013.01); *G06F 3/0659* (2013.01); *G06F 3/0689* (2013.01); *G06F 13/1673* (2013.01); *G06F 13/4291* (2013.01)

(58) Field of Classification Search
None
See application file for complete search history.

(56) References Cited

U.S. PATENT DOCUMENTS

| 6,522,188 | B1* | 2/2003 | Poole | G06F 13/387 327/141 |
| 7,519,788 | B2* | 4/2009 | LaBerge | G06F 13/1684 365/233.1 |
| 7,633,814 | B2* | 12/2009 | Wallner | G11C 7/04 365/189.05 |
| 7,872,937 | B2* | 1/2011 | Searles | G06F 13/1689 365/191 |
| 8,432,768 | B2* | 4/2013 | Ware | G11C 7/04 365/233.1 |
| 8,521,979 | B2* | 8/2013 | LaBerge | G06F 13/1689 711/167 |

* cited by examiner

*Primary Examiner* — Cheng Yuan Tseng
(74) *Attorney, Agent, or Firm* — Winston Hsu

(57) ABSTRACT

A control method of a control system includes storing output data to a memory according to a buffer pointer when a clock signal converts to a second level from a first level; storing input data to the memory according to the buffer pointer when the clock signal converts to the first level from the second level; and updating the buffer point.

10 Claims, 3 Drawing Sheets

CONTROL METHOD FOR STORING DATA ACCORDING TO BUFFER POINTER AT CLOCK SIGNAL CONVERSIONS

BACKGROUND OF THE INVENTION

1. Field of the Invention

The invention relates to a control method, and more particularly, a control method used to store data according to clock signal conversions.

2. Description of the Prior Art

In the field of server control, function units such as microcontroller units (MCUs) or programmable system-on-chips (PSoCs) have been widely used as decoder units supporting serial general purpose input/output (SGPIO) interfaces. A signal source or a data source of an SGPIO interface can usually be a platform controller hub (PCH) or a redundant array of independent disks (RAID).

The frequency of SGPIO varies with types of the PCH or RAID, and the configuration of the PCH or RAID has to be detected first. Hence, in practice, a decoder unit can be set manually according to the configuration. Afterward, the decoder unit can control displayed lights to show indication lights correctly for engineers to read conveniently.

Since manual setting is performed according to the foresaid method, external workflow and operation cost is required, and human error occurs more easily. Moreover, the PCH, RAID and decoder unit have to be designed to match one another. More design requirements have to be met. It is also difficult to increase the number of components.

SUMMARY OF THE INVENTION

An embodiment provides a control method of a control system. The method includes storing output data to a memory of a programmable unit according to a buffer pointer when a clock signal converts to a second level from a first level; storing input data to the memory according to the buffer pointer when the clock signal converts to the first level from the second level; and updating the buffer pointer after the output data and the input data are stored to the memory. The output data is transmitted to the programmable unit through a serial general purpose input/output bus, and the input data is transmitted to a host unit through the serial general purpose input/output bus.

Another embodiment provides a control system including a host unit, a serial general purpose input/output bus and a programmable unit. The host unit is used to output a clock signal and output data and receive input data. The serial general purpose input/output bus is coupled to the host unit and used to transmit the clock signal, the input data and the output data. The programmable unit is coupled to the serial general purpose input/output bus, configured to receive the clock signal and the output signal and output the input signal, and comprising a memory configured to store the input data and the output data. The output data is stored to the memory according to a buffer pointer when the clock signal converts to a second level from a first level. The input data is stored to the memory according to the buffer pointer when the clock signal converts to the first level from the second level. The buffer pointer is updated after the output data and the input data are stored to the memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
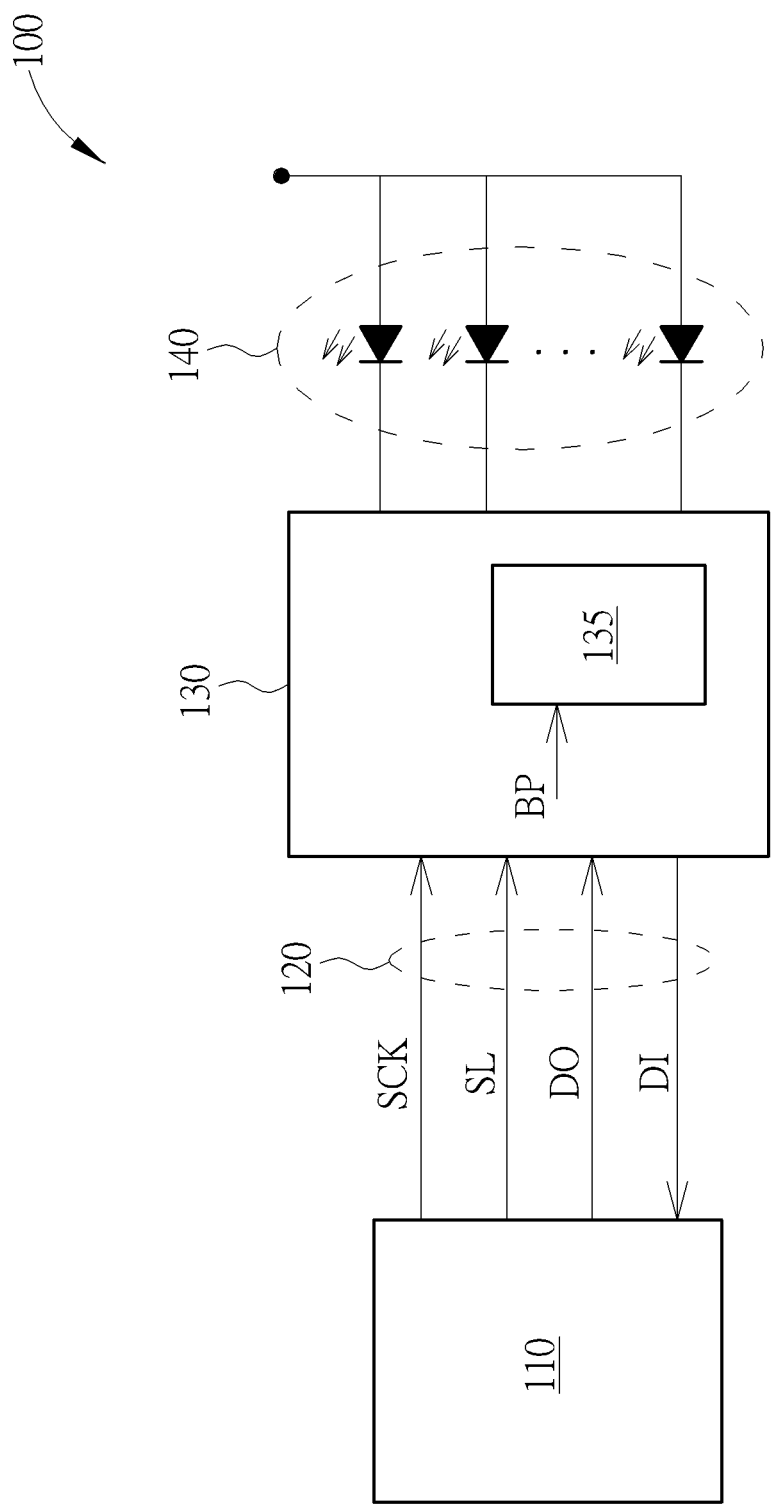
FIG. 1 illustrates a control system according to an embodiment.
Figure 2:
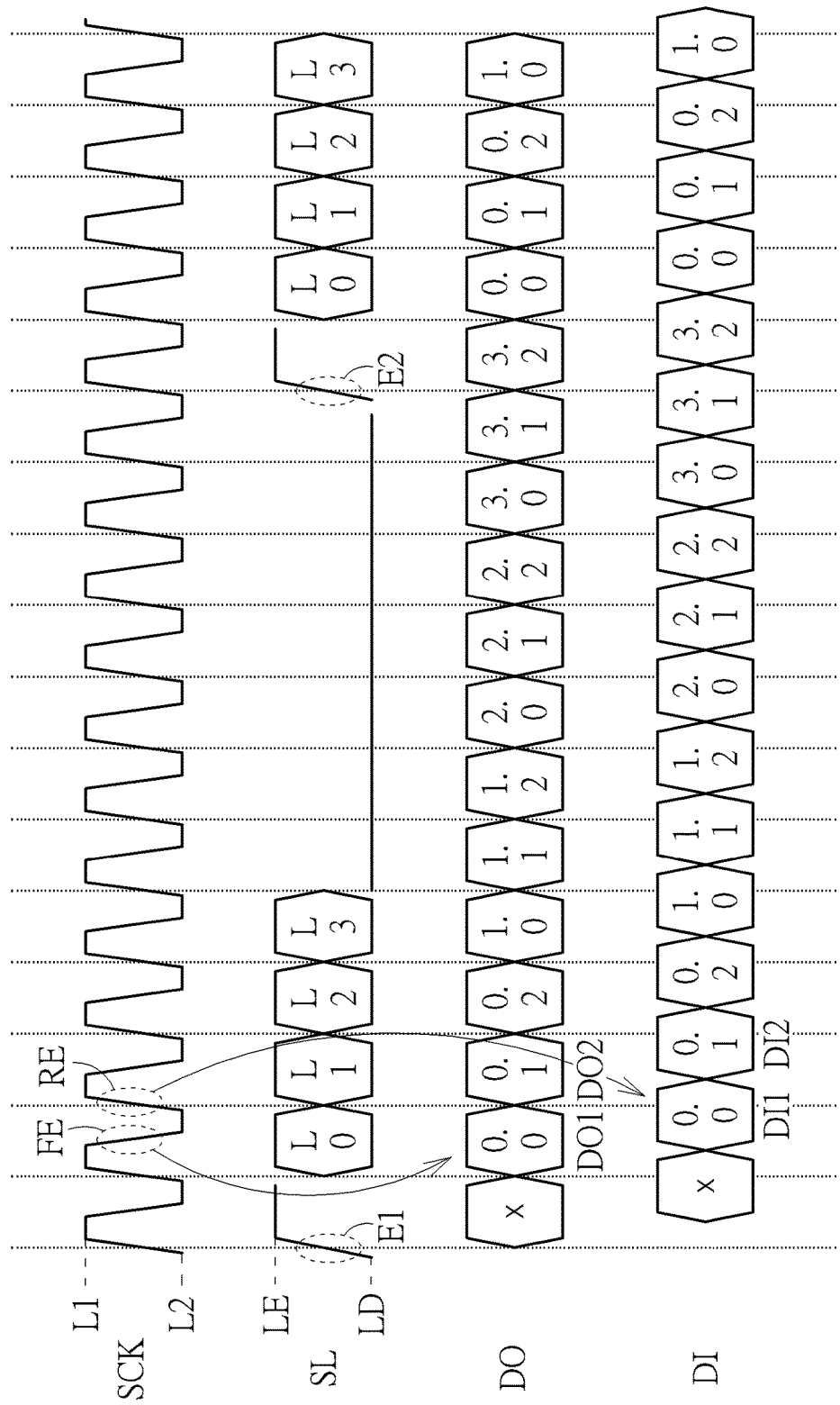
FIG. 2 illustrates a waveform diagram of signals and protocol of data of the control system of FIG. 1.

FIG. 1 illustrates a control system 100 according to an embodiment. FIG. 2 illustrates a waveform diagram of signals and protocol of data of the control system 100.

The control system 100 may include a host unit 110, a serial general purpose input/output (SGPIO) bus 120 and a programmable unit 130. The control system 100 may be a portion of a server system and used to control an SGPIO interface. The host unit 110 may be used to output a clock signal SCK, a load signal SL and output data DO and receive input data DI. The SGPIO bus 120 may be coupled to the host unit 110 and used to transmit the clock signal SCK, the input data DI and the output data DO. The programmable unit 130 may be coupled to the SGPIO bus 120, and used to receive the clock signal SCK, the load signal SL and the output signal DO and output the input signal DI. The programmable unit 130 may include a memory 135. The memory 135 may be used to store the input data DI and the output data DO according to a buffer pointer BP so that the programmable unit 130 may decode the input data DI and the output data DO. The memory 135 may be formed by logical gates of the programmable unit 130. The programmable unit 130 may be set to adjust a configuration of the memory 135.

The control system 100 may further include a set of light emitting diodes (LEDs) 140. The set of LEDs 140 may include a plurality of light emitting diodes embedded in a proper shell. The LEDs 140 may be coupled to the programmable unit 130. The programmable unit 130 may be further used to decode the input data DI to control the LEDs 140 and decode the output data DO to control the LEDs 140. The LEDs 140 may therefore provide proper light indication according to the output data DO and the input data DI for a user to read the status of the server system.

As shown in FIG. 2, each piece of the output data DO and the input data DI may include a different variable. For example, the output data DO1 may include 0.0, and the output data DO2 may include 0.1. The input data DI1 may include 0.0, the input data DI2 may include 0.1, and so on. The programmable unit 130 may decode each piece of the output data DO and the input data DI to drive the LEDs 140 to illuminate accordingly.

The host unit 110 of FIG. 1 may include a PCH and/or an RAID. The programmable unit 130 may include a complex programmable logic device (CPLD). The host unit 110 and the programmable unit 130 may form a master-slave structure, the host unit 110 may be a host terminal, and the programmable unit 130 may be a slave terminal.

As shown in FIG. 2, when the clock signal SCK converts to a second level L2 from a first level L1, the output data DO may be stored to the memory 130 according to the buffer pointer BP. When the clock signal SCK converts to the first level L1 from the second level L2, the input data DI may be stored to the memory 135 according to the buffer pointer BP.

In the embodiment of FIG. 2, the first level L1 of the clock signal SCK may be a high level, and the second level L2 may be a low level. Hence, when the clock signal SCK converts to the second level L2 from the first level L1, a falling edge may be formed. As shown in FIG. 2, a falling edge FE may correspond to a piece of output data DO1, and the output data DO1 may be stored to the memory 135 during a time interval of the falling edge FE. Moreover, when the clock signal SCK converts to the first level L1 from the second level L2, a rising edge may be formed. As shown in FIG. 2, a rising edge RE may correspond to a piece of input data DI1, and the input data DI1 may be stored to the memory 135 during a time interval of the rising edge RE.

The buffer pointer BP may be updated after the output data DO and the input data DI are stored to the memory 135. For example, a variable one may be added to the buffer pointer BP for shifting to a next pointer. Otherwise, the buffer pointer BP may be updated by performing calculation with a predetermined formula.

As shown in FIG. 2, the load signal SL may convert between a disable level LD and an enable level LE. The buffer pointer BP may be set to an initial value when the load signal SL converts to the enable level LE from the disable level LD. For example, the load signal SL may convert to the enable level LE at rising edges E1 and E2. For example, the disable level LD may be a logic 0 level, the enable level LE may be a logic 1 level, and the initial value of the buffer pointer BP may be zero. According to an embodiment, the load signal SL may convert periodically. In the example of FIG. 2, between two adjacent rising edges (e.g. E1 and E2) of the load signal SL, there may be 12 clock periods of the clock signal SCK. The arrangement of signal period in FIG. 2 may be merely an example rather than a limitation to embodiments.

Figure 3:
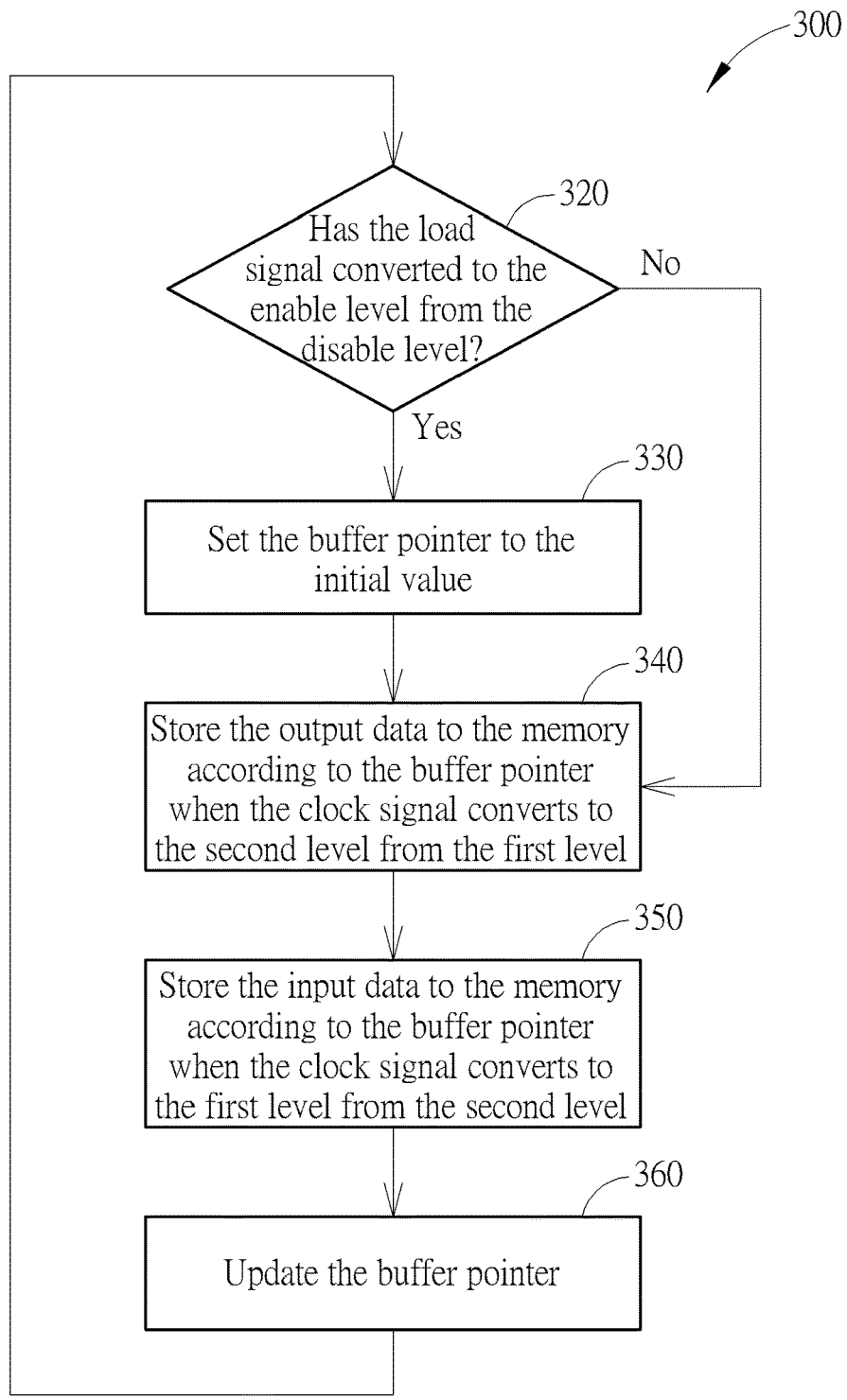
FIG. 3 illustrates a flowchart of a control method of the control system of FIG. 1.

FIG. 3 illustrates a flowchart of a control method 300 of the control system 100. As shown in FIG. 1 to FIG. 3, the control method 300 may include:

Step 320: Has the load signal SL converted to the enable level LE from the disable level LD? If so, go to Step 330; else go to Step 340;

Step 330: set the buffer pointer BP to the initial value;

Step 340: store the output data DO to the memory 135 according to the buffer pointer BP when the clock signal SCK converts to the second level L2 from the first level L1;

Step 350: store the input data DI to the memory 135 according to the buffer pointer BP when the clock signal SCK converts to the first level L1 from the second level L2; and Step 360: update the buffer pointer BP; go to Step 320.

Regarding foresaid steps, for example, Step 320 may correspond to the rising edge E1 of the load signal SL as shown in FIG. 2. Step 340 may correspond to the falling edge FE of the clock signal SCK as shown in FIG. 2. Step 350 may correspond to the rising edge RE of the clock signal SCK as shown in FIG. 2. The related details have been described above and not repeated.

According to a control system and a control method provided by an embodiment, a host unit and a programmable unit may store and decode input data and output data via an SGPIO bus and according to signal edges of a load signal and a clock signal. Hence, manual operation may be less required, and errors and inconvenience caused by manual operation may be reduced. In addition, design requirements of designing a server system may be simplified. When desiring to increase the number of SGPIO control units such as host units (e.g. PCH or RAID) or programmable units (e.g. CPLD), difficulty of engineering may be lowered by means of a control system and a control method provided by an embodiment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a control system comprising:
   storing output data to a memory of a programmable unit according to a buffer pointer when a clock signal converts to a second level from a first level;
   storing input data to the memory according to the buffer pointer when the clock signal converts to the first level from the second level; and
   updating the buffer pointer after the output data and the input data are stored to the memory;
   wherein the output data is transmitted to the programmable unit through a serial general purpose input/output bus, and the input data is transmitted to a host unit through the serial general purpose input/output bus.

2. The control method of claim 1 further comprising:
   setting the buffer pointer to an initial value when a load signal converts to an enable level from a disable level.

3. The control method of claim 2 wherein the disable level is a logic 0 level, the enable level is a logic 1 level, and the initial value is zero.

4. The control method of claim 1 wherein the first level is a high level, and the second level is a low level.

5. The control method of claim 1 further comprising:
   decoding the input data to control a set of light emitting diodes; and
   decoding the output data to control the set of light emitting diodes.

6. A control system comprising:
   a host unit configured to output a clock signal and output data and receive input data;
   a serial general purpose input/output bus coupled to the host unit and configured to transmit the clock signal, the input data and the output data; and
   a programmable unit coupled to the serial general purpose input/output bus, configured to receive the clock signal and the output signal and output the input signal, and comprising a memory configured to store the input data and the output data;
   wherein the output data is stored to the memory according to a buffer pointer when the clock signal converts to a second level from a first level; the input data is stored to the memory according to the buffer pointer when the clock signal converts to the first level from the second level; and the buffer pointer is updated after the output data and the input data are stored to the memory.

7. The control system of claim 6 wherein:
   the host unit is further configured to output a load signal;
   the serial general purpose input/output bus is further configured to transmit the load signal; and
   the programmable unit is further configured to receive the load signal and set the buffer pointer to an initial value when the load signal converts to an enable level from a disable level.

8. The control system of claim 7 wherein the disable level is a logic 0 level, the enable level is a logic 1 level, the initial value is zero, the first level is a high level, and the second level is a low level.

9. The control system of claim 6 further comprising:
a set of light emitting diodes coupled to the programmable unit;
where the programmable unit is further configured to decode the input data to control the set of light emitting diodes and decode the output data to control the set of light emitting diodes.

10. The control system of claim 6 wherein:
the host unit comprises a platform controller hub and/or a redundant array of independent disks; and
the programmable unit comprises a complex programmable logic device.

\* \* \* \* \*